THOMAS ROWE, OF NEW YORK, N. Y.

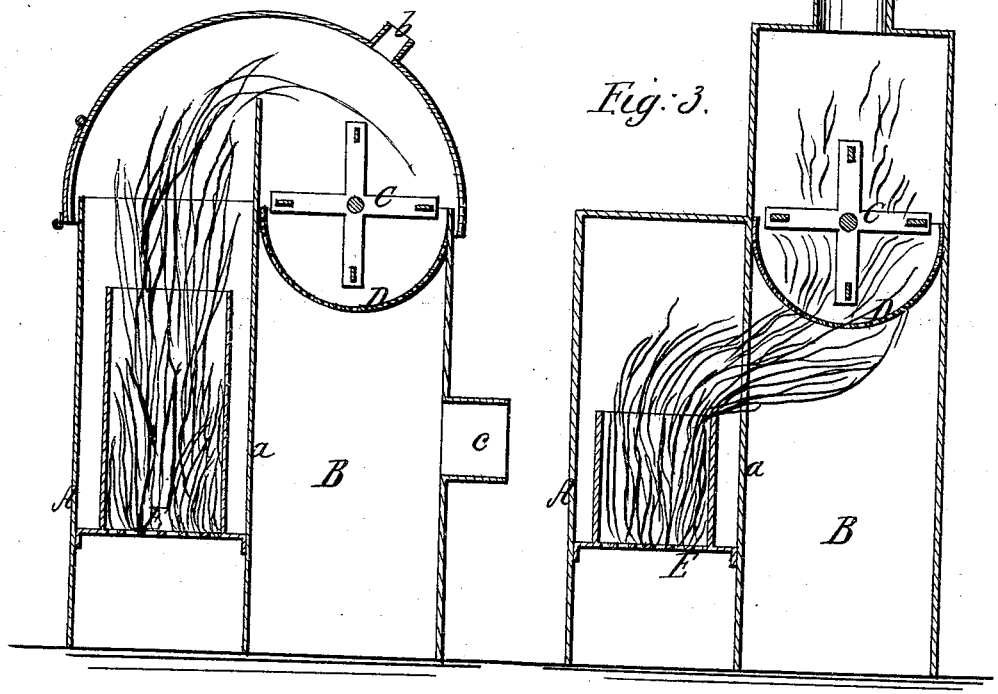

*Letters Patent No. 87,975, dated March 16, 1869.*

IMPROVEMENT IN CLEANING COTTON AND OTHER SEEDS.

The Schedule referred to in these Letters Patent and making part of the same.

*To all whom it may concern:*

Be it known that I, THOMAS ROWE, of the city, county, and State of New York, have invented a new and useful Improvement in Cleaning Cotton and other Seeds; and I do hereby declare the following to be a full, clear, and exact description, which will enable those skilled in the art to make and use the same, reference being had to the accompanying drawing, forming part of this specification, in which drawing—

Figure 1 represents a vertical section of this invention.

Figure 2 is a plan or top view of the same.

Figure 3 is a section of a modification of the same.

Similar letters indicate corresponding parts.

The object of this invention is to clean the seeds of cotton, or other plants or vegetables which are used in producing oil, and reduce them to such a state, before they are crushed, that they are freed from all matters or substances which tend to reduce the yield of oil or to impair its value.

My invention consists in exposing the seeds to be cleaned to the combined action of beaters or agitators and of heat or flame, in such a manner, that by the action of the beaters or agitators, each seed is exposed to the heat or flame, and then, by the heat or flame the fibres, gummy or resinous matters, or other impurities adhering to said seeds, are rendered crisp and brittle, and finally, by the agitation, such crisp and brittle impurities are readily separated from the seed. While the seeds are exposed to the heat or flame, and to the agitation, they are supported by a sieve, or perforated plate which retains such seeds until they are freed from the adhering impurities, when it allows the same to drop through its meshes, or perforations in a clean state, fit for the crushing-operation.

The apparatus which I use in carrying out my invention, consists of a chamber, A, which is divided by a transverse partition, $a'$, into two compartments, one of which may be designated the seed-compartment B, while the other contains the fire-place, or furnace E.

The seed to be cleaned is introduced into the seed-compartment through an aperture, or hopper, $b$, and it drops upon a perforated plate, or sieve, D, where it is exposed to the action of the beater or agitator C.

The flame and products of combustion rising from the furnace, pass over the top edge of the partition $a$, down through the sieve D, and escape through a flue, $c$, in the lower part of the seed-compartment.

The seeds, on being deposited on the sieve D, are acted upon simultaneously by the beater or agitator C, and by the heat or flame rising from the furnace, so that each separate seed is exposed to the flame or heat, and after the fibre or other impurities adhering to said seeds have been rendered crisp, or brittle by the heat, they are readily separated from the seeds by the action of the beater or agitator, and the clean seeds drop down through the perforations, or meshes of the sieve, said perforations being made of such a size that they do not permit the seeds to pass through until they are perfectly freed from fibres and other adhering impurities.

The heat and flame, instead of being made to pass down through the sieve, as shown in fig. 1, might be made to pass up through the same, as indicated in fig. 3, which represents a modification of the former apparatus.

The requisite agitation might also be given to the seed by making the sieve movable, either revolving or reciprocating, with or without beaters.

Having thus described my invention,

What I claim as new, and desire to secure by Letters Patent, is—

The within-described process of removing fibres and other impurities from the seeds of cotton and other plants, by the combined action of an agitator, and of heat or flame, applied substantially in the manner shown and described.

Also, the agitator C and sieve D, in the seed-compartment B, in combination with the furnace, or fire-place E, substantially in the manner set forth.

THOMAS ROWE.

Witnesses:
 W. HAUFF,
 ERNEST F. KASTENHUBER.